United States Patent [19]

Wong

[11] Patent Number: 5,751,617
[45] Date of Patent: May 12, 1998

[54] CALCULATING THE AVERAGE OF TWO INTEGER NUMBERS ROUNDED AWAY FROM ZERO IN A SINGLE INSTRUCTION CYCLE

[75] Inventor: Roney S. Wong, Sunnyvale, Calif.

[73] Assignee: Samsung Electronics Co., Ltd., Rep. of Korea

[21] Appl. No.: 636,047

[22] Filed: Apr. 22, 1996

[51] Int. Cl.$^6$ ........................................................ G06F 7/38
[52] U.S. Cl. ............................................................ 364/734
[58] Field of Search ...................... 364/715.011, 715.013, 364/715.08, 719, 723, 724.16, 734, 745.01, 745.02

[56] References Cited

U.S. PATENT DOCUMENTS

| | | | |
|---|---|---|---|
| 3,789,203 | 1/1974 | Catherall et al. | 364/723 |
| 4,031,370 | 6/1977 | Catherall | 364/723 |
| 4,040,052 | 8/1977 | Stanislaw | 342/197 |
| 4,334,237 | 6/1982 | Reitmeier et al. | 348/619 |
| 4,368,433 | 1/1983 | Imazeki et al. | 327/126 |
| 5,260,975 | 11/1993 | Saito | 375/327 |
| 5,428,567 | 6/1995 | Horvath et al. | 371/49.1 |
| 5,481,553 | 1/1996 | Suzuki et al. | 371/49.1 |

*Primary Examiner*—Chuong Dinh Ngo
*Attorney, Agent, or Firm*—Skjerven, Morrill, MacPherson, Franklin & Friel, LLP; David M. Sigmond

[57] ABSTRACT

The average of two signed or unsigned integer numbers (A, B) rounded away from zero as prescribed in the MPEG standard is calculated in one instruction cycle by right shifting each of the operands by one bit position, summing the shifted operands, and incrementing the result as appropriate. The shifted operands are summed in an adder (302) that provides two versions of the average, one being the sum of the shifted operands and the other being the sum-plus-one of the shifted operands. A multiplexer (310) under control of a control circuit (308) selects one of the sum and sum-plus-one outputs. Incrementing (selecting the sum-plus-one output) is based on inspection of the shifted-out bits of the operands, the most significant bit of the sum, and a mode signal indicative of whether the operands are signed or unsigned values.

15 Claims, 5 Drawing Sheets

CALCULATING THE AVERAGE OF TWO INTEGER NUMBERS ROUNDED AWAY FROM ZERO IN A SINGLE INSTRUCTION CYCLE

BACKGROUND OF THE INVENTION

1. Field of the Invention

The present invention relates to calculating the average of two integer numbers, and more particularly to single instruction cycle calculation of the average of two signed or unsigned integer numbers with a correctly rounded result and without errors due to overflowing of intermediate results.

2. Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

The MPEG standards impose the need for bidirectional temporal differential pulse code modulation (DPCM) and half pixel motion estimation. FIG. 1 shows an illustrative block of pixels X. In practice, a block contains more pixels than shown in FIG. 1, which is abbreviated for clarity. For example, typically in video signal processing, the basic video information processing unit is a macro-block, which has a 16×16 pixel matrix comprising four 8×8 luminance blocks, and two 8×8 chrominance blocks. Each macro-block is part of a much larger luminance or chrominance frame, as the case may be. In FIG. 1, the pixel X represents either luminance or chrominance, with the output corresponding to an unsigned integer number.

MPEG motion processing involves half pixel motion estimation as well as full pixel motion estimation. In FIG. 1, the "H" points represent horizontal interpolations, the "V" points represent vertical interpolations, and the "Y" points represent both horizontal and vertical interpolations. The interpolations "H" and "V" are calculated in accordance with the expression $$(X_1+X_2)/\!/2 \qquad (1)$$

wherein $X_1$ and $X_2$ are horizontally contiguous pixels for the interpolation "H" and are vertically contiguous pixels for the interpolation "V." The interpolations "Y" are calculated in accordance with the expression $$(X_1+X_2+X_3+X_4)/\!/4 \qquad (2)$$

wherein $X_1$ and $X_3$ and $X_2$ and $X_4$ are diagonally contiguous pixels. In expressions (1) and (2), the symbol "//" represents integer division with rounding to the nearest integer. Half-integer values are rounded away from zero, as specified by the MPEG standard. For instance, 3//2 is rounded to 2, and −3//2 is rounded to −2.

The average of integer operands $X_1$ and $X_2$ has been implemented by summing the operands to obtain an intermediate result, and then right shifting the intermediate result by one bit in order to divide the intermediate result by two. While this is a simple operation, it does not necessarily lead to a properly rounded result in accordance with the MPEG standard. Furthermore, if the intermediate result overflows before right-shifting occurs then the result will not be properly rounded in accordance with the MPEG standard. Moreover, the operation may require a general purpose computer to execute several instruction cycles.

In calculation intensive applications such as MPEG motion processing, it is highly desirable to calculate the average of two integers rounded away from zero in a rapid and efficient manner.

SUMMARY OF THE INVENTION

A method or apparatus in accordance with the present invention advantageously provides in one instruction cycle the average of two signed or unsigned integer numbers. The average is rounded away from zero as prescribed in the MPEG standard. Moreover, the intermediate results do not overflow, thereby preserving arithmetic accuracy.

These and other advantages are realized in the present invention, in which one embodiment is a method of operating a circuit to obtain an average of two operands, including signed and unsigned integer numbers, such that the average is an integer rounded away from zero. In this embodiment, each of the operands is right-shifted by one bit position, wherein bits in a lowest significant bit position of the operands become shifted-out bits. The right-shifted operands are summed to obtain a result. The result is incremented when it has an unsigned value and any of the shifted-out bits is a one, when it has a positive signed value and any of the shifted-out bits is a one, and when it has a negative signed value and both of the shifted-out bits are one's. Otherwise, the result is not incremented.

In another embodiment, the present invention is an apparatus comprising a sum adder, a sum-plus-one adder, a control circuit, and a multiplexer in combination. The sum adder has A and B operand inputs coupled to respective right-shifted integer numbers A and B, wherein bits in a lowest significant bit position of the integer numbers A and B are shifted-out bits. The sum-plus-one adder also has A and B operand inputs coupled to the respective right-shifted integer numbers A and B. The control circuit has its inputs coupled to the shifted-out bits and to a most significant bit position in the output of the sum adder, and has a control output. The multiplexer has one input coupled to the output of the sum adder and another input coupled to the output of the sum-plus-one adder, and has a select input coupled to the control output of the control circuit. The multiplexer outputs the average of A and B rounded away from zero.

BRIEF DESCRIPTION OF THE DRAWINGS

In the drawings, in which like reference characters indicate like parts:

FIG. 1 is an illustrative block of pixels showing half pixel interpolations as specified by the MPEG standard;

DETAILED DESCRIPTION OF THE PREFERRED EMBODIMENTS

The average of two signed or unsigned integer numbers rounded away from zero as prescribed in the MPEG standard is calculated in one instruction cycle by right shifting each of the operands by one, summing the shifted operands, and rounding the result as appropriate. For unsigned operands, rounding is based on inspection of the shifted-out bits. Increment the result if any of the shifted-out bits is a one, else do not increment the result. For signed operands, rounding is based on inspection of the shifted-out bits and the most significant bit ("MSB") of the result. For a positive result (MSB=0), increment the result if any of the shifted-out bits is a one, else do not increment the result. For a negative result (MSB=1), increment the result if both of the shifted-out bits are one's. Otherwise, do not increment the result.

As used herein, signed numbers are represented in 2's complement form in which positive numbers include zero. Positive and negative numbers indicate that the numbers are signed. A logical right-shift inserts a zero into the most significant bit position of the shifted operand, whereas an arithmetic right shift copies the most significant bit (or sign bit) of the pre-shifted operand into the most significant bit position of the shifted operand thereby providing sign extention. Furthermore, incrementing refers to increasing by one.

Figure 2:
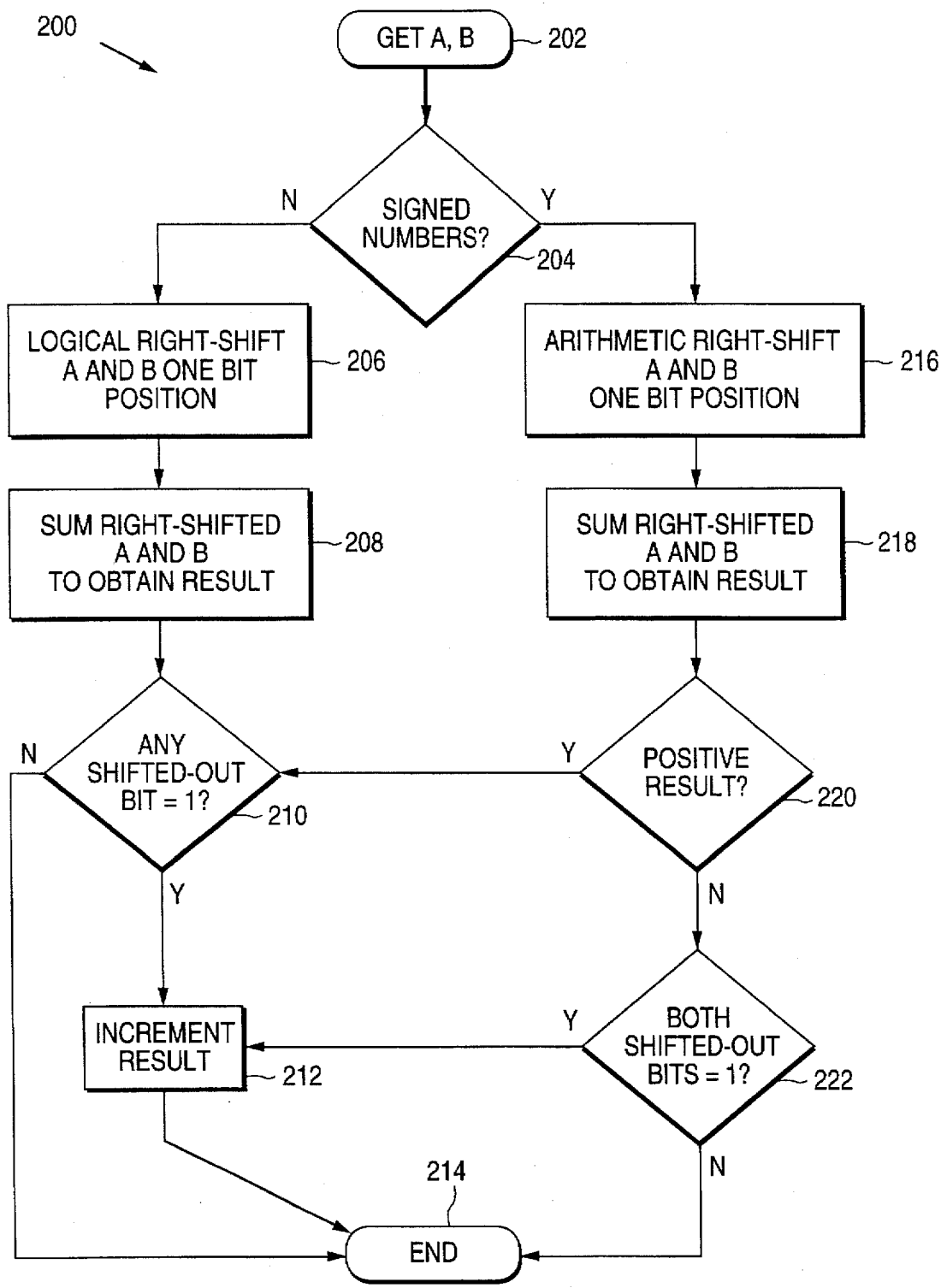
FIG. 2 is a flow chart of an algorithm in accordance with the present invention.

FIG. 2 is a flow chart of algorithm 200 in accordance with the invention At step 202, binary operands A and B are obtained. Decision step 204 determines whether operands A and B are signed numbers. If operands A and B are unsigned numbers, at step 206 operands A and B are logically right-shifted one bit position such that the lowest significant bit of each operand is shifted out, and at step 208 the right-shifted operands A and B are summed to obtain a result. Decision step 210 then tests whether any shifted-out bit is a one. If so, the result is incremented at step 212 and the algorithm ends at step 214, otherwise the algorithm proceeds directly to end step 214. Returning to decision step 204, if operands A and B are signed numbers then at step 216 operands A and B are arithmetically right-shifted one bit position such that the lowest significant bit of each operand is shifted-out. At step 218, the right-shifted operands A and B are summed to obtain a result. At decision step 220, if the result is positive the algorithm branches to decision step 210 and proceeds as previously described, whereas if the result is negative then the algorithm branches to decision step 222. Decision step 222 tests whether both shifted-out bits are one's. If so, the result is incremented at step 212 and the algorithm ends at step 214, otherwise the algorithm proceeds directly to end step 214.

Variations to algorithm 200 are apparent. For instance, detecting both shifted-out bits as one's can lead to the incrementing step whether the result is positive or negative. Likewise, detecting both shifted-out bits as zeros can lead to skipping the increment step whether the result is positive or negative. Furthermore, a sum and sum-plus-one result can be calculated from the right-shifted operands and the appropriate result selected.

Consider the case of unsigned numbers in more detail. For unsigned numbers, rounding a half way value away from zero always means rounding up. If we inspect the two shifted right lower significant bits ("LSBs"), the possibilities are 00, 01, 10 and 11. For these four possibilities, 0+0=0, 0+1=1, 1+0=1, and 1+1=10. Each of the right-shifted bits has a weight of $0.1_2$, or $0.5_{10}$, so that halfway values are rounded up, or away from zero. That is, $0.1_2$ is rounded to $1.0_2$, while $0.1_2+0.1_2$ is carried to $1.0_2$. In summary, for unsigned operands increment the result if any of the shifted-out bits is a one, else do not increment the result. Various examples of unsigned operands algorithm 200 are listed below in Table 1.

TABLE 1

AVERAGE OF TWO UNSIGNED NUMBERS ROUNDED AWAY FROM ZERO

| Operands (Decimal) | Operands (Binary) | Add Right-Shifted Operands | Shifted-Out Bits | Sign Bit | Increment? | Result | |
|---|---|---|---|---|---|---|---|
| 7 | 0111 | 0011 | 1 | N.A. | yes | 0101 | |
| 5 | 0101 | + 0010 | 1 | | | + 0001 | (carry from shifted-out bits) |
| (6 avg) | | 0101 | | | | 0110 | (decimal 6) |
| 7 | 0111 | 0011 | 1 | N.A. | yes | 0101 | |
| 4 | 0100 | + 0010 | 0 | | | + 0001 | (round up) |
| (5.5 avg) | | 0101 | | | | 0110 | (decimal 6) |
| 15 | 1111 | 0111 | 1 | N.A. | yes | 1110 | |
| 15 | 1111 | + 0111 | 1 | | | + 0001 | (carry from shifted-outbits) |
| (15 avg) | | 1110 | | | | 1111 | (decimal 15) |
| 13 | 1101 | 0110 | 1 | N.A. | yes | 1100 | |
| 12 | 1100 | + 0110 | 0 | | | + 0001 | (round up) |
| (12.5 avg) | | 1100 | | | | 1101 | (decimal 13) |
| 6 | 0110 | 0011 | 0 | N.A. | no | 0101 | |
| 4 | 0100 | + 0010 | 0 | | | + 0000 | (no rounding) |
| (5 avg) | | 0101 | | | | 0101 | (decimal 15) |

Consider the case of signed numbers in more detail. For signed numbers, if the sum of two shifted numbers is positive, the analysis follows the rules for rounding unsigned numbers. This is applicable not only to averaging two positive numbers, but also to averaging a positive number and a negative number provided the averaged value is a positive result. Various examples of signed operands applied to algorithm 200 where the sum of the two right-shifted numbers is a positive result are listed below in Table 2.

Prior to the incrementing decision, a positive result is either the correct result or too small by one (e.g., 4 should be 5), whereas a negative result is either the correct result or

TABLE 2

AVERAGE OF TWO SIGNED NUMBERS ROUNDED AWAY FROM ZERO - POSITIVE RESULT

| Operands (Decimal) | Operands (Binary) | Add Right-Shifted Operands | Shifted-Out Bits | Sign Bit | Increment? | Result | |
|---|---|---|---|---|---|---|---|
| +6 | 0110 | 0011 | 0 | 0 | no | 0101 | |
| +4 | 0100 | + 0010 | 0 | | | +0000 | (no rounding) |
| (5 avg) | | 0101 | | | | 0101 | (decimal 5) |
| +5 | 0101 | 0010 | 1 | 0 | yes | 0101 | |
| +7 | 0111 | + 0011 | 1 | | | +0001 | (carry from shifted-out bits) |
| (6 avg) | | 0101 | | | | 0110 | (decimal 6) |
| −3 | 1101 | 1110 | 1 | 0 | yes | 0000 | |
| +4 | 0100 | + 0010 | 0 | | | + 0001 | (round up) |
| (0.5 avg) | | 0000 (ignore overflow) | | | | 0001 | (decimal 1) |
| +7 | 0111 | 0011 | 1 | 0 | yes | 0110 | |
| +7 | 0111 | + 0011 | 1 | | | + 0001 | (carry from shifted-out bits) |
| (7 avg) | | 0110 | | | | 0111 | (decimal 7) |

Additionally for signed numbers, if the sum of two shifted numbers is negative, a different rounding rule is applied. Observe that the value of an n-bit signed (2's complement) number A is given by the expression $$-A_{n-1} \times 2^{n-1} + \sum_{i=0}^{n-2} A_{n-2-i} \times 2^{n-2-i} \qquad (3)$$

where the bits are enumerated from 0 to n-1 for any value of integer n. For example, for n=4, $$0\ 1\ 1\ 1 = (-2^{4-1} \times 0) + (2^{4-2} \times 1) + (2^{4-3} \times 1) + (2^{4-4} \times 1) = 0+4+2+1 = 7 \qquad (4)$$

$$1\ 1\ 1\ 1 = (-2^{4-1} \times 1) + (2^{4-2} \times 1) + (2^{4-3} \times 1) + (2^{4-4} \times 1) = -8+4+2+1 = -1 \qquad (5)$$

$$1\ 0\ 0\ 0 = (-2^{4-1} \times 1) + (2^{4-2} \times 0) + (2^{4-3} \times 0) + (2^{4-4} \times 0) = -8+0+0+0 = -8 \qquad (6)$$

Hence, the MSB of a signed two's complement number, which is the sign bit, has a value or weight of $-2^{n-1}$ while the other bits all have a positive value or weight. The available operation is an increment by one, which adds a positive value to the LSB of the final result whether the final result is positive or negative.

too large by one (e.g., −5 should be −4). Where the result is positive and the shifted-out bits are 01 or 10, this is the half way case and incrementing by one rounds away from zero. Where the result is positive and the shifted-out bits are 11, the carry from the shifted-out bits is provided by incrementing by one. Where the result is positive and the shifted-out bits are 00, the shifted-out bits do not change the result and no incrementing occurs. Where the result is negative and the shifted-out bits are 01 or 10, this is the halfway case and the result is already rounded away from zero, so no incrementing occurs. Where the result is negative and the shifted-out bits are 00, the result is already correct and no incrementing occurs. Where the result is negative and the shifted-out bits are 11, incrementing by one rounds down (or offsets) a pre-existing round away from zero, thereby providing the correct result. Various examples of signed operands applied to algorithm 200 where the sum of the two right-shifted numbers is a negative result are listed below in Table 3.

TABLE 3

AVERAGE OF TWO SIGNED NUMBERS ROUNDED AWAY FROM ZERO - NEGATIVE RESULT

| Operands (Decimal) | Operands (Binary) | Add Right-Shifted Operands | Shifted-Out Bits | Sign Bit | Increment? | Result | |
|---|---|---|---|---|---|---|---|
| −5 | 1011 | 1101 | 1 | 1 | yes | 1101 | |
| +1 | 0001 | + 0000 | 1 | | | + 0001 | (offset improper round) |
| (−2 avg) | | 1101 | | | | 1110 | (decimal −2) |
| −6 | 1010 | 1101 | 0 | 1 | no | 1110 | |
| +3 | 0011 | + 0001 | 1 | | | + 0000 | (round down) |
| (−1.5 avg) | | + 1110 | | | | 1110 | (decimal −2) |
| −6 | 1010 | 1101 | 0 | 1 | no | 1110 | |
| +2 | 0010 | + 0001 | 0 | | | + 0000 | (no rounding) |

TABLE 3-continued

AVERAGE OF TWO SIGNED NUMBERS ROUNDED AWAY FROM ZERO - NEGATIVE RESULT

| Operands (Decimal) | Operands (Binary) | Add Right-Shifted Operands | Shifted-Out Bits | Sign Bit | Increment? | Result | |
|---|---|---|---|---|---|---|---|
| (−2 avg) | | 1110 | | | | 1110 | (decimal −2) |
| −5 | 1011 | 1101 | 1 | 1 | yes | 1011 | |
| −3 | 1101 | + 1110 | 1 | | | + 0001 | (offset improper round) |
| (−4 avg) | | 1011 (ignore overflow) | 11 | | | 1100 | (decimal −4) |
| −4 | 1100 | 1110 | 0 | 1 | no | 1101 | |
| −1 | 1111 | + 1111 | 1 | | | + 0000 | (round down) |
| (−2.5 avg) | | 1101 (ignore overflow) | | | | 1101 | (decimal −3) |
| −4 | 1100 | 1110 | 0 | 1 | no | 1101 | |
| −2 | 1110 | + 1111 | 0 | | | + 0000 | (no rounding) |
| (−3 avg) | | 1101 (ignore overflow) | | | | 1101 | (decimal −3) |

When the operands are n-bit numbers, the right-shifted operands can be considered n-1 bit operands. Summing the right-shifted n-1 bit operands generates an n-bit result in which overflow does not occur. Thus, if the right-shifted operands are considered n-bit numbers, then any overflow in the n-bit result that arises due to summing the right-shifted operands can be ignored.

It is noted that an unsigned result and a positive result contains at least one "0" before incrementing occurs. Therefore, incrementing an unsigned result or a positive result does not cause overflow. In the case of a negative result, incrementing the negative result serves to decrease its magnitude and therefore does not cause overflow.

Figure 3:
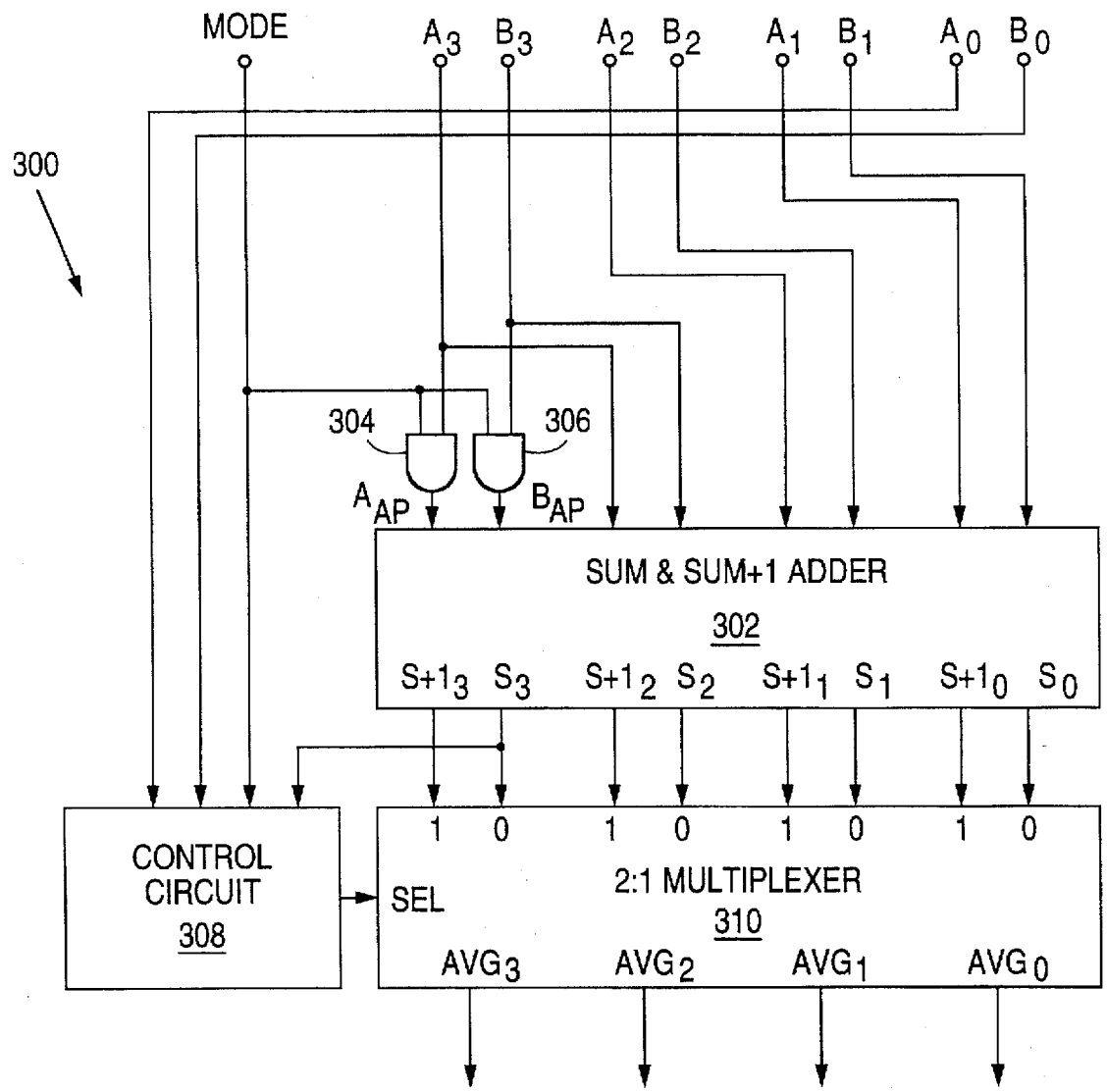
FIG. 3 is a block diagram of a logic circuit in accordance with the present invention.

FIG. 3 is a block diagram of a logic circuit 300 for averaging two signed or unsigned four-bit numbers A and B in the manner described above. The binary numbers A and B are right-shifted by applying their respective bit positions $A_1$ and $B_1$ to stage 0 of adder 302, respective bit positions $A_2$ and $B_2$ to stage 1 of adder 302, and respective bit positions $A_3$ and $B_3$ to stage 2 of adder 302. Stage 3 of adder 302 receives appended bits indicating the sign of A and B if signed, or appended bits as zero's if A and B are unsigned. The appended bits are determined by AND gates 304 and 306. A MODE signal is a logical 1 for signed numbers, in which case AND gates 304 and 306 pass (or sign extend) the sign bits $A_3$ and $B_3$ respectively as appended bits $A_{AP}$ and $B_{AP}$ to the third stage of adder 302. The MODE signal is a logical 0 for unsigned numbers, in which case AND gates 304 and 306 block the bits $A_3$ and $B_3$ and force to zero the inputs of the third stage of the adder 302.

Other techniques for right shifting are known in the art, and include having shift registers for the operands A and B that provide their respective outputs to the respective operand inputs of the adder, and right shifting operands A and B in their respective shift registers before determining the sum and sum-plus-one in an adder. Alternatively, operands A and B can be stored in registers that append a bit to the MSB+1 bit position, with the appended bit being zero for unsigned numbers and the MSB value for signed numbers, before providing the adder with operand outputs that include the appended bit and exclude the lowest significant bit.

Control circuit 308 receives the right-shifted LSB bits $A_0$ and $B_0$ and the MODE signal, and generates select signal SEL for causing a 2:1 multiplexer 310 to select either the sum or the sum-plus-one output of adder 302 as the output of circuit 300. Control circuit 308 implements the expression $$SEL = \overline{MODE} \cdot \overline{S_3} \cdot (A_0 + B_0) + MODE \cdot S_3 \cdot A_0 \cdot B_0 \tag{7}$$

so that SEL is 1 to select the SUM+1 outputs of the adder 302 if $\overline{S_3}(A_0+B_0)$ or $S_3 A_0 B_0$ is one for signed numbers, or if $A_0+B_0$ is one for unsigned numbers; else SEL is 0 to select the SUM outputs of adder 302.

Figure 4:
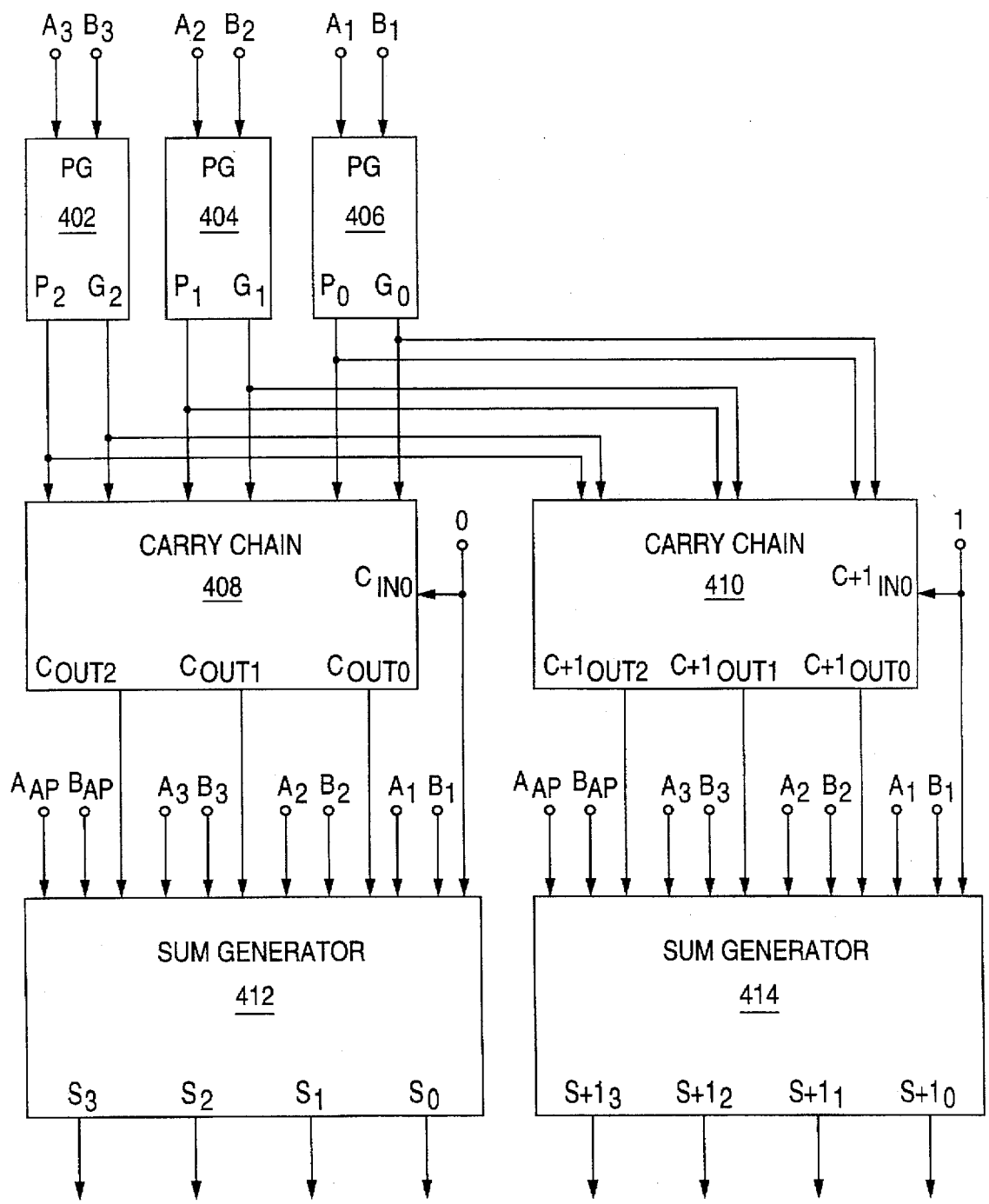
FIG. 4 is a block diagram of an adder suitable for use in the circuit of FIG. 3.

FIG. 4 shows an implementation for adder 302. In this implementation, the sum and sum-plus-one outputs are provided by carry lookahead adders. The carry lookahead adders perform fast addition within the basic step time of an instruction cycle. Propagate-generate (PG) sections 402, 404, and 406 provide propagate and generate signals $P_2$ and $G_2$, $P_1$ and $G_1$, and $P_0$ and $G_0$ for $A_3$ and $B_3$, $A_2$ and $B_2$, and $A_1$ and $B_1$, respectively, representing the $2^3$, $2^2$, and $2^1$ bit positions of the binary numbers A and B, respectively. The propagate and generate signals are furnished to respective stages of carry chains 408 and 410. Carry chain 408 receives a "0" as its least significant carry-in bit $C_{IN0}$, and generates carry-out bits $C_{OUT2}$, $C_{OUT1}$ and $C_{OUT0}$ corresponding to the sum of $A_3$ and $B_3$, $A_2$ and $B_2$, and $A1$ and $B_1$ and a zero, respectively. Carry chain 410 receives a "1" as its least significant carry-in bit $C+1_{IN0}$, and generates carry-out bits $C+1_{OUT2}$, $C+1_{OUT1}$ and $C+1_{OUT0}$ corresponding to the sum of $A_3$ and $B_3$, $A_2$ and $B_2$, and $A_1$ and $B_1$ and a one, respectively. Carry-out bits $C_{OUT2}$, $C_{OUT1}$ and $C_{OUT0}$ provide carry-in bits for stage 3, stage 2, and stage 1, respectively, of sum generator 412, with a "0" providing a carry-in bit for stage 0 of sum generator 412, whereas carry-out bits $C+1_{OUT2}$, $C+1_{OUT1}$ and $C+1_{OUT0}$ provide carry-in bits to stage 3, stage 2, and stage 1, respectively, of sum generator 414, with a "1" providing a carry-in bit for stage 0 of sum generator 414.

Sum generator 412 sums $A_{AP}$, $B_{AP}$ and $C_{OUT2}$ at stage 3 to provide $S_3$, sums $A_3$, $B_3$ and $C_{OUT1}$ at stage 2 to provide $S_2$, sums $A_2$, $B_2$ and $C_{OUT0}$ at stage 1 to provide $S_1$, and sums $A_1$, $B_1$ and a "0" at stage 0 to provide $S_0$. Sum generator 414 sums $A_{AP}$, $B_{AP}$ and $C+1_{OUT2}$ at stage 3 to provide S+1₃, sums A₃, B₃ and C+1_{OUT1} at stage 2 to provide S+1₂, sums A₂, B₂ and C+1_{OUT0} at stage 1 to provide S+1₁ and sums A₁, B₁ and a "1" at stage 0 to provide S+1₀. Thus, sum generator 412 provides the sum output, and sum generator 414 provides the sum-plus-one output. Each stage of the sum generators may include, for instance, first and second two-input exclusive-or gates (not shown), with the inputs of the first exclusive- or gate and the second input of the second exclusive or gate receiving the numbers to be summed, the output of the first exclusive-or gate coupled to the first input of the second exclusive-or gate, and the output of the second exclusive-or gate providing the result. Suitable PG sections, carry chains and sum generators are well-known in the art. Furthermore, any circuit such as a carry select adder that implements a sum and a sum-plus-one of two binary numbers may be used for adder 302.

Figure 5:
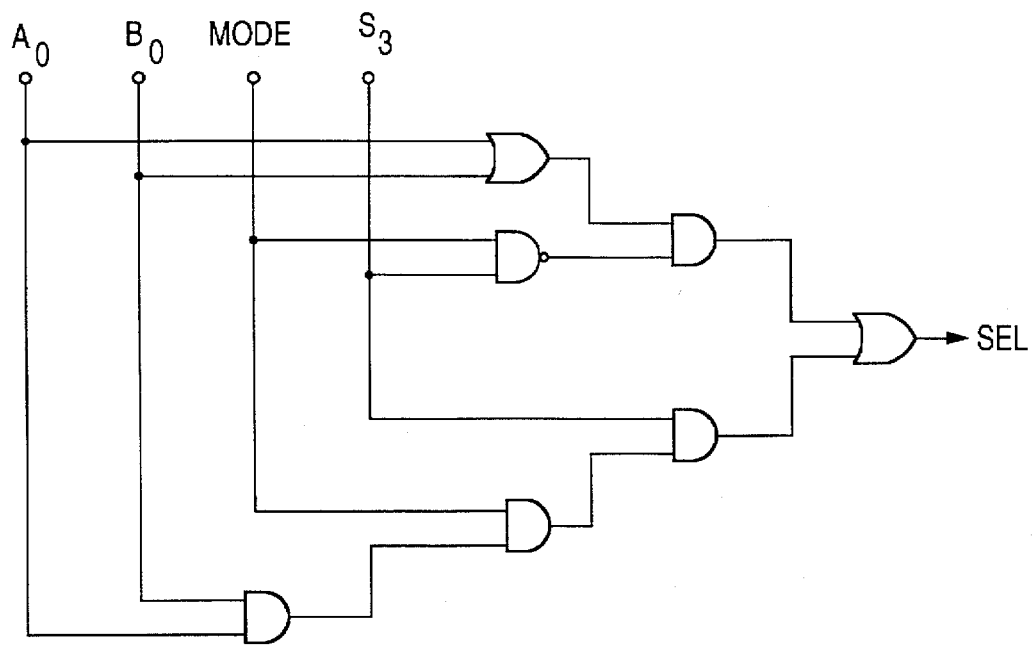
FIG. 5 is a circuit diagram of a control circuit suitable for use in the circuit of FIG. 3.
Figure 6:
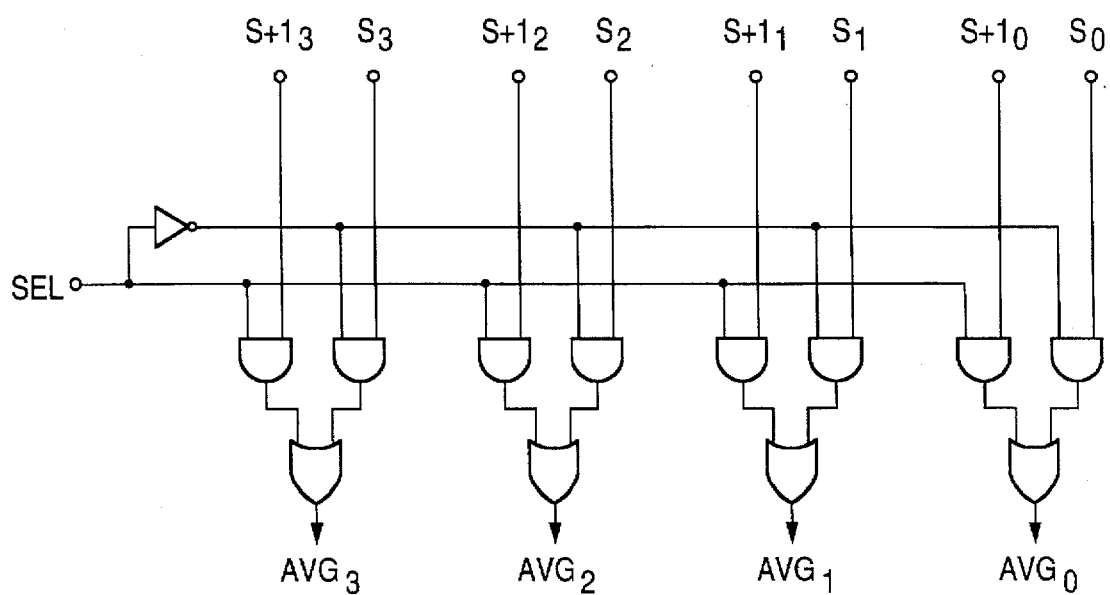
FIG. 6 is a circuit diagram of a multiplexer suitable for use in the circuit of FIG. 3.

FIG. 5 shows an implementation for control circuit 308 in accordance with expression (7) above, and FIG. 6 shows an implementation for multiplexer 310. Numerous 2:1 multiplexer designs and related data selector circuits are well-known in the art.

The description of the invention set forth herein is illustrative, and is not intended to limit the scope of the invention as set forth in the following claims. For example, adder 302, control circuit 308, and multiplexer 310 maybe implemented in any suitable circuitry. The operands can be any bit length of at least two. A general purpose computer or processor can execute the invention in a single instruction cycle (as is preferred) or multiple instruction cycles. The invention is well-suited for many applications besides MPEG motion processing. Variations and modifications of the embodiments disclosed herein may be made based on the description set forth herein, without departing from the scope and spirit of the invention as set forth in the following claims.

What is claimed is:

1. A method of operating a circuit to obtain an average of two unsigned operands such that the average is an integer rounded away from zero in a single instruction cycle, comprising:

logically right-shifting each of the operands by one bit position, wherein bits in a lowest significant bit position of the operands become shifted-out bits;

summing the right-shifted operands to obtain a result; and incrementing the result when any of the shifted-out bits is a one.

2. A method of operating a circuit to obtain an average of two signed operands such that the average is an integer rounded away from zero in a single instruction cycle, comprising:

arithmetically right-shifting each of the operands by one bit position, wherein bits in a lowest significant bit position of the operands become shifted-out bits;

summing the right-shifted operands to obtain a result; and incrementing the result when the result has a positive value and any of the shifted-out bits is a one, and when the result has a negative value and both of the shifted-out bits are one's.

3. A method of operating a circuit to obtain an average of two operands, including signed and unsigned integer numbers, such that the average is an integer rounded away from zero in a single instruction cycle, comprising:

right shifting each of the operands by one bit position, wherein the right shifting is a logical right shift when the operands are unsigned numbers and the right shifting is an arithmetic right shift when the operands are signed numbers, such that bits in a lowest significant bit position of the operands become shifted-out bits;

summing the right-shifted operands to obtain a result; and incrementing the result when the result has an unsigned value and any of the shifted-out bits is a one, when the result has a positive value and any of the shifted-out bits is a one, and when the result has a negative value and both of the shifted-out bits are one's.

4. The method of claim 3, performed in MPEG motion processing.

5. The method of claim 3, perjoined by a processor.

6. A method of operating a circuit to obtain an average of two signed operands such that the average is an integer rounded away from zero in a single instruction cycle, comprising:

obtaining first and second signed n-bit operands;

sign-extending the operands to obtain n+1 bit sign-extended operands, wherein the sign-extended operands each include n bits concatenated to a single lowest significant bit;

summing the n bits of the sign-extended operands without the lowest significant bits of the sign-extended operands to obtain an n-bit result;

incrementing the result to provide an n-bit signed average of the operands when the result has a positive value and the lowest significant bit of either sign-extended operand is a one, and when the result has a negative value and the lowest significant bit of both sign-extended operands is a one; and providing the result as the n-bit signed average of the operands when the result has a positive value and the lowest significant bit of both sign-extended operands is a zero, and when the result has a negative value and the lowest significant bit of either sign-extended operand is a zero.

7. The method of claim 6, wherein the summing is performed by an n-bit adder.

8. The method of claim 7, wherein the n-bit adder includes an n-bit sum adder and an n-bit sum-plus-one adder, incrementing the result to provide the average includes selecting an output of the sum-plus-one adder, and providing the result as the average includes selecting an output of the sum adder.

9. The method of claim 8, performed in a MPEG motion processing.

10. An apparatus for obtaining an average of two operands such that the average is an integer rounded away from zero, comprising:

a sum adder having a sum output with a most significant bit position, and having A and B operand inputs coupled to respective right-shifted integer numbers A and B, wherein bits in a lowest significant bit position of the integer numbers A and B are shifted-out bits;

a sum-plus-one adder having a sum-plus-one output, and having A and B operand inputs coupled to the respective right-shifted integer numbers A and B;

a control circuit having inputs coupled to the shifted-out bits of the sum output, and having a control output; and a multiplexer having a first input coupled to the sum output and a second input coupled to the sum-plus-one output, and having a select input coupled to the control output of the control circuit.

11. An apparatus for obtaining an average of two operands, including signed and unsigned integer numbers, such that the average is an integer rounded away from zero, comprising:

a sum adder having a sum output with a most significant bit position, and having A and B operand inputs coupled to respective right-shifted integer numbers A and B, wherein bits in a lowest significant bit position of the integer numbers A and B are shifted-out bits;

a sum-plus-one adder having a sum-plus-one output, and having A and B operand inputs coupled to the respective right-shifted integer numbers A and B;

a control circuit having inputs coupled to the shifted-out bits, to the most significant bit position of the sum output, and to a mode signal indicative of whether the integer numbers A and B and the sum output are signed or unsigned values, and having a control output; and a multiplexer having a first input coupled to the sum output and a second input coupled to the sum-plus-one output, and having a select input coupled to the control output of the control circuit;

wherein the right-shifted integer numbers A and B are logically right-shifted when the mode signal indicates unsigned values, and the right-shifted integer numbers A and B are arithmetically right-shifted when the mode signal indicates signed values; and wherein the control output of the control circuit causes the multiplexer to select the second input thereof:

when the mode signal indicates an unsigned value and any of the shifted-out bits is a one, when the mode signal indicates a signed value, the most significant bit position indicates a positive value, and any of the shifted-out bits is a one, and when the mode signal indicates a signed value, the most significant bit position indicates a negative value, and both of the shifted-out bits are one's, and otherwise causes the multiplexer to select the first input thereof.

12. The apparatus of claim 11, wherein the sum adder includes first propagate-generate sections coupled to a first carry chain coupled to a first sum generator that provides the sum output, and the sum-plus-one adder includes second propogate-generate sections coupled to a second carry chain coupled to a second sum generator that provides the sum-plus-one output.

13. The apparatus of claim 12, wherein the sum adder and the sum-plus-one adder share the first and second propogate-generate sections, the first carry chain and the first sum generator have a least significant carry-in bit set to logical 0, and the second carry chain and the second sum generator have a least significant carry-in bit set to logical 1.

14. An apparatus for obtaining an average of two operands, including signed and unsigned integer numbers, such that the average is an integer rounded away from zero, comprising:

a sum adder having a sum output S with a most significant bit position SMSB, and having A and B operand inputs coupled to respective right-shifted integer numbers A and B, wherein bits in a lowest significant bit position of the integer numbers A and B are shifted-out bits $A_0$ and $B_0$;

a sum-plus-one adder having a sum-plus-one output S+1, and having A and B operand inputs coupled to the respective right-shifted integer numbers A and B;

a control circuit having inputs coupled to $A_0$, $B_0$, $S_{MSB}$, and a mode signal MODE indicative of whether integer numbers A and B and the sum output S are signed or unsigned values; and a multiplexer having a first input coupled to the sum output S of the sum adder, having a second input coupled to the sum-plus-one output S+1 of the sum-plus-one adder, and having a select input SEL coupled to an output of the control circuit;

wherein the output of the control circuit is determined in accordance with the expression $$SEL = \overline{MODE} \cdot \overline{S_{MSB}} \cdot (A_0 + B_0) + MODE \cdot S_{MSB} \cdot A_0 \cdot B_0.$$

15. An apparatus for obtaining an average of two operands, including signed and unsigned integer numbers, such that the average is an integer rounded away from zero, comprising:

means for recognizing whether the operands are signed or unsigned values;

means for right shifting each of the operands by one bit position, wherein the right shifting is a logical right shift when the operands have unsigned values and an arithmetic right shift when the operands have signed values, such that bits in a lowest significant bit position of the operands become shifted-out bits;

means for summing the right-shifted operands to obtain a result; and means for incrementing the result when the result has an unsigned value and any of the shifted-out bits is a one, when the result has a positive value and any of the shifted out bits is a one, when the result has a negative value and both of the shifted-out bits are one's, and otherwise not incrementing the result.

\* \* \* \* \*

UNITED STATES PATENT AND TRADEMARK OFFICE
CERTIFICATE OF CORRECTION

PATENT NO.     :   5,751,617
ISSUE DATE     :   May 12, 1998
INVENTOR(S)    :   Wong, Roney S.

It is certified that error appears in the above-identified patent and that said Letters Patent is hereby corrected as shown below:

Col. 2, line 43, delete "its"
Col. 4, line 31, delete "+0.12" and insert --+0.1$_2$--
Col. 4, line 31, delete "1.02" and insert --1.0$_2$--
Col. 4, line 34, insert --applied to-- before "algorithm 200"
Table 3, fourth example (operands -4 and -2) in the "shifted-out bits" column, delete "11"
Col. 8, line 51, delete "A1" and insert --A$_1$--
Col. 9, line 9, delete "exclusive or" and insert --exclusive-or--
Col. 9, line 25, delete "maybe" and insert --may be--
Claim 14, col. 12, line 2, delete "SMSB" and insert --S$_{MSB}$--

Signed and Sealed this

Twenty-third Day of February, 1999

Attest:

Attesting Officer

Q. TODD DICKINSON

Acting Commissioner of Patents and Trademarks